Patented Dec. 11, 1928.

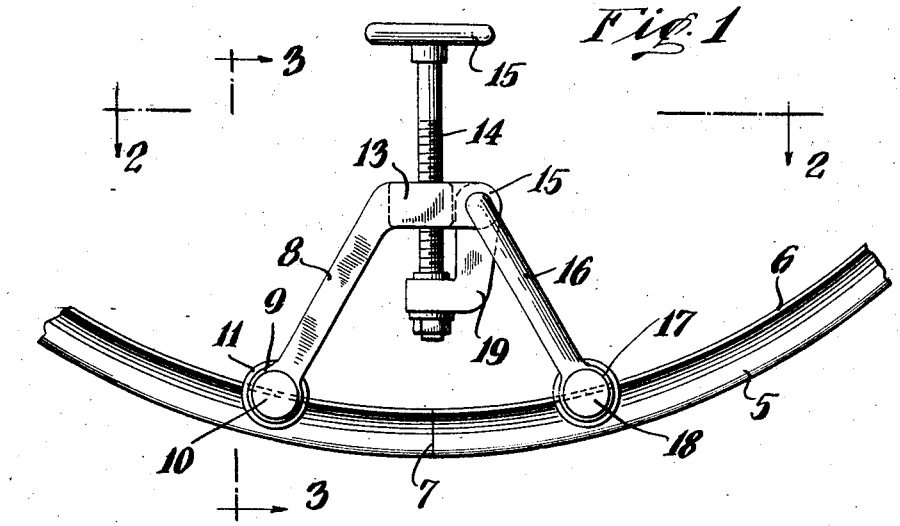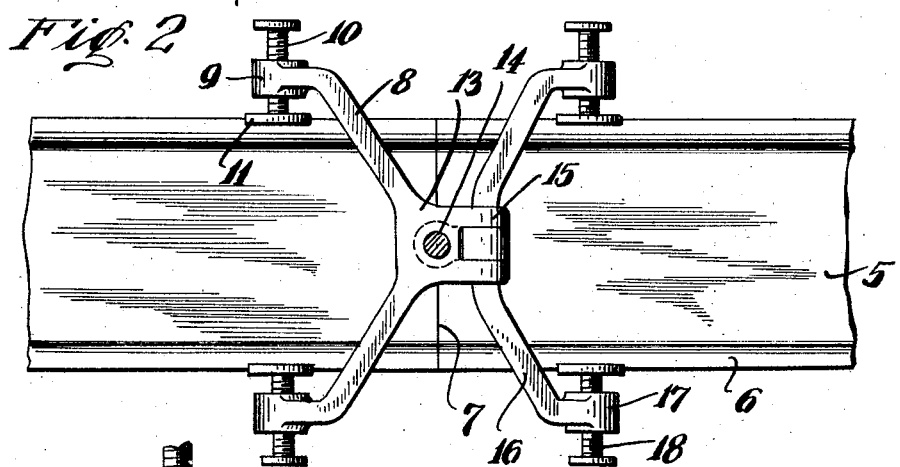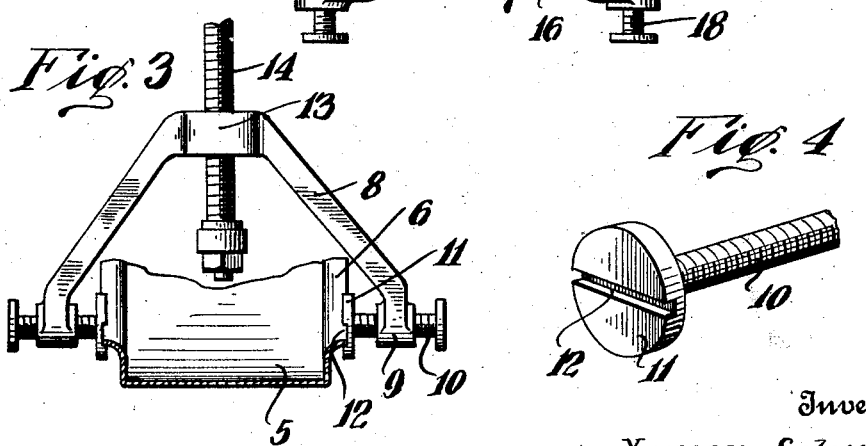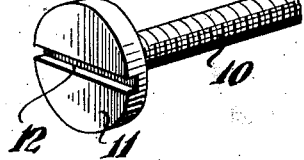

1,694,893

UNITED STATES PATENT OFFICE.

XAVER SCHNEIDER, OF YONKERS, NEW YORK.

TIRE-RIM TOOL.

Application filed August 31, 1927. Serial No. 216,520.

This invention relates to automobile accessories, and more particularly to a device used to aid the separation of the sections of a tire rim.

Heretofore, if any changing of a punctured or blown-out tire was necessary or to remove the inner tube from the shoe, much trouble was encountered in doing so, because of the fastness with which the section of the conventional metal rim held together; such delay often necessitating the unnecessary expenditure of a great amount of time and energy.

It is therefore the main object of this invention to provide a tool having effective grips to easily open the conventional tire rim and afford easy removal of the inner tube or shoe.

A further aim is in the provision of the device of the class described, which is made of few and simple parts, rendering the same inexpensive to the automobile owner.

These several objects, together with others, which will become apparent as the description progresses, are attained by the novel construction, combination and arrangement of parts, hereinafter described and illustrated in the accompanying drawing, constituting a material component of this application, and in which:—

Figure 1 is a fragmentary side elevational view of a conventional tire rim, showing the application of the device.

Figure 2 is a top plan view of the same looking on line 2—2 of Figure 1.

Figure 3 is a fragmentary, transverse sectional view taken on line 3—3 of Figure 1.

Figure 4 is an enlarged fragmentary perspective view of one of the gripping elements.

In the drawing, the numeral 5 generally designates a conventional clincher rim, having the usual outwardly flared side edges 6, the rim being slit so that the ends meet at 7.

A pair of converging arms 8 are provided at their lower ends with collars 9, in which are adjustably threaded, screws 10 having enlarged heads 11 on their inner ends, provided with transverse grooves 12 adapted to engage the outwardly flared edges 6 of the rim.

The upper ends of the arms 8 are integrally formed with a block 13 in which is engageable an adjustable screw 14 having a small hand wheel 15 on its upper end.

Formed with the block 13 are lugs 15, between which is pivotally mounted the yoke of a pair of downwardly diverging arms 16, having collars 17 at their lower ends, in which are engageable screws 18 similar to the elements 10, the screws 18 also engaging the edges 6 of the rim on the opposite side of the meeting point 7.

Fixed on the yoke of the arms 16 intermediate the lug is an L-shaped lever 19, into which is threaded the lower end of the screw 14.

Thus, it will be seen that when the screws 10 and 18 are tightened, to rigidly engage the edges 6 of the rim, on both sides of the leading points 7 and the hand wheel 15 is rotated, the member 19 will be moved in a downward, arcuate path, obviously separating the section of the rim.

From the foregoing, it will be seen that a simple tool has been disclosed, which is adapted to readily separate the sections of a conventional tire rim, to enable the easy removal of the inner tube or shoe, thus saving heretofore unnecessarily expended time and energy.

While the foregoing is descriptive of the preferred embodiment of my invention, I do not wish to be limited to the exact details thereof, as changes may be made without departing from the spirit and scope of the appended claim.

Having thus described my invention, what I claim as new and desire to secure by Letters Patent, is:—

A tool for separating the section of a tire rim comprising a block, a pair of arms fixed to said block, a second pair of arms rotatable in said block, collars on the lower ends of said arms, screws engaged in said collars, disc heads on the inner ends of said screws, said heads being provided with a transverse groove adapted to grip the side edges of the rim, a lever fixed to said second pair of arms, and means rotatable in said block adapted to move said lever in an arcuate path to separate said arms.

In witness whereof I have affixed my signature.

XAVER SCHNEIDER.